United States Patent [19]

Clark et al.

[11] 4,210,586
[45] Jul. 1, 1980

[54] DISPERSE DYES FROM 2-BROMO, CHLORO, OR CYANO-4,6-DINITROANILINE AND SELECTED ALKYL-3-(2'-ALKOXY-5-ALKANOYLAMINOANILINO)BUTYRATE OR ALKYL-4-(2'-ALKOXY-5'-ALKANOYLAMINOANILINO)VALERATE

[75] Inventors: Gary T. Clark; Max A. Weaver, Kingsport, both of Tenn.

[73] Assignee: Eastman Kodak Company, Rochester, N.Y.

[21] Appl. No.: 918,250

[22] Filed: Jun. 23, 1978

[51] Int. Cl.$^2$ .............................................. C09B 29/06
[52] U.S. Cl. .................................. 260/207.1; 260/152; 260/207
[58] Field of Search ............................. 260/207, 207.1

[56] References Cited

U.S. PATENT DOCUMENTS

| 2,373,700 | 4/1945 | McNally et al. ................. 260/207 X |
| 2,470,094 | 5/1949 | Dickey et al. ................. 260/207.1 X |
| 3,406,165 | 10/1968 | Kruckenberg ..................... 260/207.1 |
| 3,544,550 | 12/1970 | Anderton et al. .................. 260/207.1 |
| 3,553,190 | 1/1971 | Anderton et al. ............. 260/207.1 X |
| 3,558,593 | 1/1971 | Lindner et al. ..................... 206/207.1 |
| 3,980,636 | 9/1976 | Weaver .............................. 260/152 X |

Primary Examiner—Helen M. S. Sneed
Attorney, Agent, or Firm—Donald W. Spurrell; Daniel B. Reece, III

[57] ABSTRACT

This invention concerns certain substituted aniline coupled dyes, and, in particular, disperse dyes from 2-bromo, chloro, or cyano-4,6-dinitroaniline and selected alkyl-3-(2'-alkoxy-5'-alkanoylaminoanilino)butyrates and alkyl-4-(2'-alkoxy-5'-alkanoylaminoanilino)valerates. These dyes impart bright, blue shades with excellent colorfastness to polyester fibers, and have excellent dyeing properties by either heat fixation or exhaust (boil and pressure) methods of application on polyester fibers. These dyes are also useful for dyeing cellulose ester fibers and polyamides such as nylon.

3 Claims, No Drawings

DISPERSE DYES FROM 2-BROMO, CHLORO, OR CYANO-4,6-DINITROANILINE AND SELECTED ALKYL-3-(2'-ALKOXY-5'-ALKANOYLAMINOANILINO)BUTYRATE OR ALKYL-4-(2'-ALKOXY-5'-ALKANOYLAMINOANILINO)VALERATE

This invention concerns certain substituted aniline coupled dyes, and, in particular, disperse dyes from 2-bromo, chloro, or cyano-4,6-dinitroaniline and selected alkyl-3-(2'-alkoxy-5'-alkanoylaminoanilino)butyrates and alkyl-4-(2'alkoxy-5'-alkanoylaminoanilino)valerates. These dyes impart bright, blue shades with excellent colorfastness to polyester fibers, and have excellent dyeing properties by either heat fixation or exhaust (boil and pressure) methods of application on polyester fibers. These dyes are also useful for dyeing cellulose ester fibers and polyamides such as nylon.

The fastness and dyeing properties of the present dyes depend upon the unobvious substitution on the aniline nitrogen with certain groups in combination with other specific structure to give dyes of the following general formula

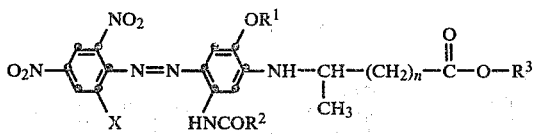

wherein
X is Br, Cl, or CN,
$R^1$ is straight or branched alkyl of 1 to 4 carbons,
$R^2$ is straight or branched alkyl of 1 to 4 carbons or phenyl,
n is 1 or 2, and
$R^3$ is straight or branched alkyl of 1–6 carbons, cyclohexyl, benzyl, phenyl, or said alkyl substituted with —O—$R^4$O—$C_2H_4$—O—$R^4$, —Cl,

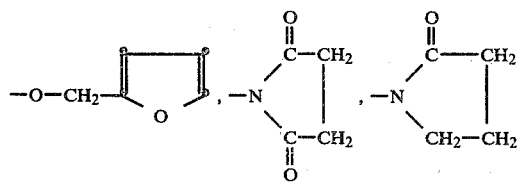

phenyl, phenoxy, cyclohexyl, cyclohexyloxy, NHCO—$R^4$, N($R^4$)$_2$, acyloxy,

—S—$R^4$, or —SO$_2$—$R^4$ where $R^4$ is straight or branched alkyl of 1 to 6 carbons.

The dyes of this invention impart bright, blue shades to synthetic fibers such as nylon, cellulose acetate, cellulose triacetate, and especially polyester. These days have excellent light, wash, crock, gas, acid or basic perspiration, and sublimation fastness on the above fibers, and exhibit excellent pH stability over a range of 4–10 when applied to polyester above the boil (220°–275° F.). The build-up characteristics or color yield, exhaustion of dye onto the fiber, pH stability, stability to dry heat (blooming), and rate of dyeing of these dyes are superior to dyes of close chemical structure. The good reproducibility of these dyes is reflected in their leveling (migration) and barre coverage abilities on polyester fabrics. The dyes have excellent shade reproducibility by all methods of application, including boil, pressure, and heat fixation on polyester fibers.

Preparation of Coupler

The couplers of this invention can be prepared from either 2-methoxy-5-acetamidoaniline or 2-nitro-4-acetamidoanisole and the appropriate acetoacetic acid esters or levulinic acid esters. The preparation of ethyl 3-(2'-methoxy-5'-acetamidoanilino)butyrate is as follows:

A mixture of 105.0 g. (0.5 mole) of 2-nitro-4-acetamidoanisole, 67.0 g. (0.5 mole) of ethyl acetoacetate, 550 ml. of isopropyl alcohol, 10.0 g. of 5% Pt/C, and 3.0 g. of p-toluenesulfonic acid is treated in an autoclave at 165° C. and 1,000 psi of hydrogen until the uptake of hydrogen ceases. The solvent and catalysts are removed. Upon standing, 143.8 g. (98%) of ethyl 3-(2'-methoxy-5-acetamidoanilino)butyrate is obtained. NMR analysis of the product supports the proposed structure.

Dyes

The dyes listed in Table 1 are prepared by diazotization of 2-bromo or chloro-4,6-dinitroaniline and coupling with one of the above couplers of the general formula. The 2-cyano-4,6-dinitroaniline dyes are prepared by the cyandie displacement of the corresponding 2-bromo dye.

EXAMPLE 1

A. Diazotization of 2-bromo-4,6-dinitroaniline

To a solution of nitrosylsulfuric acid [from NaNO$_2$ (18.0 g.) and H$_2$SO$_4$ (125 ml.)] is added 1–5 acid (100 ml. —1 part propionic acid and 5 parts acetic acid) below 20° C. This is cooled to 0°–5° C. and 65.5 grams (0.25 mole) of 2-bromo-4,6-dinitroaniline is dissolved in 200 ml. of H$_2$SO$_4$ and added dropwise below 5° C. The reaction is allowed to stir at 0°–5° C. for two hours to complete diazotization.

B. Coupling

To a solution of 73.0 g. (0.25 mole) of ethyl 3-(2'-methoxy-5'-acetamidoanilino) butyrate in 500 ml. of 15% aqueous sulfuric acid is added to above diazo solution with stirring below 20° C. The reaction is allowed to stand for one hour at 0°–10° C. The mineral acid is neutralized to congo red paper with 50% aqueous sodium hydroxide. The product is collected by filtration, washed with water and air-dried to yield 141.75 g. (78%) of the following dye.

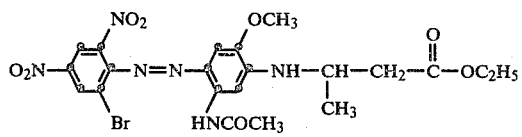

C. Cyanide displacement

A portion (20.9 g., 0.037 mole) of the dye from 1-B is dissolved in 150 ml. of dimethylformamide. A solution of sodium dicyano-cuprate prepared from 3.74 ml. of 25% aqueous sodium cyanide, 3.74 ml. of water and 1.98 g. (0.022 mole) of cuprous cyanide is added to the dimethylformamide solution at 90°–95° C. with stirring. The reaction is sitrred at 90°–95° C. for 1.25 hours. To the solution is added 600 ml. of isopropyl alcohol. The reaction is allowed to attain room temperature and cooled with an ice bath to 0°–10° C. The dye is collected by filtration and washed with isopropyl alcohol. Upon drying 13.9 g. (72%) of the following dye is obtained.

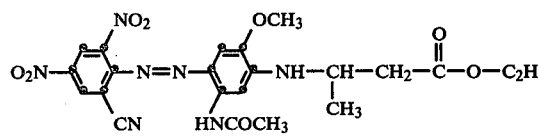

Table 1

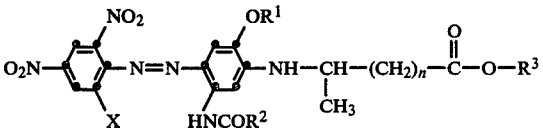

| Example | X | $R^1$ | $R^2$ | n | $R^3$ |
|---|---|---|---|---|---|
| 1 | Cl | $CH_3$ | $CH_3$ | 2 | $C_2H_5$ |
| 2 | Br | $CH_3$ | $CH_3$ | 2 | $C_2H_5$ |
| 3 | Cn | $CH_3$ | $CH_3$ | 2 | $C_2H_5$ |
| 4 | CN | $CH_3$ | $CH_3$ | 2 | $C_2H_5$ |
| 5 | Cl | $CH_3$ | $CH_3$ | 1 | $C_2H_5$ |
| 6 | Br | $CH_3$ | $CH_3$ | 1 | $C_2H_4OCH_3$ |
| 7 | Br | $CH_3$ | $CH_3$ | 1 | $C_2H_4O-C_2H_5$ |
| 8 | Br | $CH_3$ | $CH_3$ | 1 | $C_2H_4-C_2H_4O-C_2H_5$ |
| 9 | CN | $CH_3$ | $CH_3$ | 1 | $C_2H_4OCH_3$ |
| 10 | Br | $CH_3$ | $CH_3$ | 1 | $C_6H_{11}$ |
| 11 | Br | $CH_3$ | $CH_3$ | 1 | $CH_2C_6H_5$ |
| 12 | Br | $CH_3$ | $CH_3$ | 1 | $CH_2C_6H_5$ |
| 13 | Br | $CH_3$ | $CH_3$ | 1 | $C_2H_4-N\underset{C-CH_2}{\overset{C-CH_2}{<}}$ (succinimide) |
| 14 | Br | $CH_3$ | $CH_3$ | 1 | $CH_2$-furyl |
| 15 | CN | $CH_3$ | $CH_3$ | 1 | $C_6H_{11}$ |
| 16 | CN | $CH_3$ | $CH_3$ | 1 | $C_2H_4OCH_3$ |
| 17 | Br | $CH_3$ | $CH_3$ | 2 | $C_2H_4OCH_3$ |
| 18 | CN | $CH_3$ | $CH_3$ | 2 | $C_2H_4OCH_3$ |
| 19 | Br | $CH_3$ | $CH_3$ | 2 | $C_2H_4O-C_2H_4OC_2H_5$ |
| 20 | CN | $CH_3$ | $CH_3$ | 2 | $C_2H_4O-C_2H_4OC_2H_5$ |
| 21 | Br | $C_2H_5$ | $C_2H_5$ | 1 | $C_2H_5$ |
| 22 | Br | $C_2H_5$ | $C_6H_5$ | 1 | $C_2H_5$ |
| 23 | Br | $CH_3$ | $CH_3$ | 1 | $C_4H_9$ |
| 24 | Br | $CH_3$ | $CH_3$ | 1 | $CH_3$ |
| 25 | Br | $CH_3$ | $CH_3$ | 1 | $C_2H_4C_6H_5$ |
| 26 | Br | $CH_3$ | $CH_3$ | 1 | $C_2H_4OC_6H_5$ |
| 27 | Br | $CH_3$ | $CH_3$ | 1 | $CH_2$-thienyl |
| 28 | Br | $CH_3$ | $CH_3$ | 1 | $CH_2CH_2O$-thienyl |
| 29 | Br | $CH_3$ | $CH_3$ | 1 | $CH_2CH_2NHCOCH_3$ |
| 30 | Br | $CH_3$ | $CH_3$ | 1 | $CH_2CH_2OCOCH_3$ |
| 31 | Br | $CH_3$ | $CH_3$ | 1 | $CH_2CH_2OCONH_2$ |
| 32 | Br | $CH_3$ | $CH_3$ | 1 | $CH_2CH_2N(CH_3)_2$ |
| 33 | Br | $CH_3$ | $CH_3$ | 1 | $CH_2CH_2NCHO$ |
| 34 | Br | $CH_3$ | $CH_3$ | 1 | $CH_2CH_2O$-C$_6$H$_4$-$OCH_3$ |

Table 1-continued

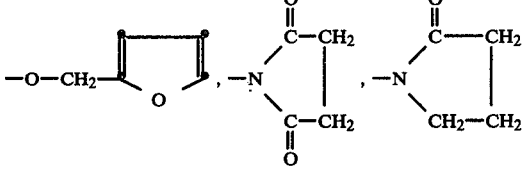

| Example | X | $R^1$ | $R^2$ | n | $R^3$ |
|---|---|---|---|---|---|
| 35 | Br | $CH_3$ | $CH_3$ | 1 | $CH_2CH_2CH_2N\underset{CH_2-CH_2}{\overset{CO-CH_2}{<}}$ (glutarimide) |
| 36 | Br | $CH_3$ | $CH_3$ | 1 | $CH_2CH_2SC_2H_5$ |
| 37 | Br | $CH_3$ | $CH_3$ | 1 | $CH_2CH_2SO_2C_2H_5$ |
| 38 | Br | $CH_3$ | $CH_3$ | 1 | $CH_2CH_2OC(O)$-furyl |

The invention has been described in detail with particular reference to certain preferred embodiments thereof, but it will be understood that variations and modifications can be effected within the spirit and scope of the invention.

We claim:

1. A compound of the formula

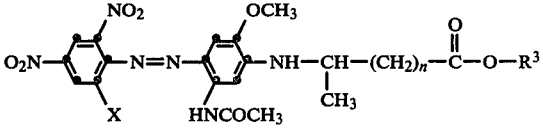

wherein
X is Br, Cl, or CN,
$R^1$ is straight or branched alkyl of 1 to 4 carbons,
$R^2$ is straight or branched alkyl of 1 to 4 carbons, or phenyl,
n is 1 or 2, and
$R^3$ is straight or branched alkyl of 1 to 6 carbons cyclohexyl, benzyl, phenyl or said alkyl substituted with —O—$R^4$, O—$C_2H_4$—$R^4$, —Cl, $$-O-CH_2-\text{(furyl)}, \quad -N\underset{C-CH_2}{\overset{C-CH_2}{<}}_{\overset{\parallel}{O}}^{\overset{\parallel}{O}}, \quad -N\underset{CH_2-CH_2}{\overset{C-CH_2}{<}}_{\overset{\parallel}{O}}$$

phenyl, phenoxy, cyclohexyl, cyclohexyloxy, NHCO—$R^4$, N($R^4$)$_2$, acyloxy, $$-OCNH_2,\quad (\text{with } C=O)$$

—S—$R^4$ or —SO$_2$—$R^4$, where $R^4$ is straight or branched alkyl of 1 to 4 carbons.

2. A compound according to claim 1 of the formula

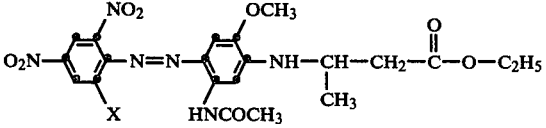

wherein X is selected from Cl, Br, and CN, n is 1 or 2, and $R^3$ is selected from —$C_2H_5$, —$C_2H_4$—O—$CH_3$, —$C_2H_4$—O—$C_2H_5$, —$C_2H_4$—O—$C_2H_4$—O—$C_2H_5$, and —$C_6H_{11}$.

3. A compound according to claim 1 of the formula $$O_2N-\underset{\underset{X}{|}}{\overset{\overset{NO_2}{|}}{C_6H_2}}-N=N-\underset{\underset{HNCOCH_3}{|}}{\overset{\overset{OCH_3}{|}}{C_6H_2}}-NH-CH(CH_3)-CH_2-C(=O)-O-C_2H_5$$

wherein X is Br or CN.

* * * * *